(12) United States Patent
Lu et al.

(10) Patent No.: US 12,051,256 B2
(45) Date of Patent: Jul. 30, 2024

(54) ENTRY DETECTION AND RECOGNITION FOR CUSTOM FORMS

(71) Applicant: Microsoft Technology Licensing, LLC, Redmond, WA (US)

(72) Inventors: Yijuan Lu, Bellevue, WA (US); Lynsey Liu, Seattle, WA (US); Andrei A. Gaivoronski, Redmond, WA (US); Yu Cheng, Redmond, WA (US); Dinei Afonso Ferreira Florencio, Redmond, WA (US); Cha Zhang, Bellevue, WA (US); John Richard Corring, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 395 days.

(21) Appl. No.: 17/473,623

(22) Filed: Sep. 13, 2021

(65) Prior Publication Data
US 2023/0084845 A1 Mar. 16, 2023

(51) Int. Cl.
G06K 9/00 (2022.01)
G06F 18/214 (2023.01)
(Continued)

(52) U.S. Cl.
CPC .......... G06V 30/414 (2022.01); G06F 18/214 (2023.01); G06F 40/284 (2020.01);
(Continued)

(58) Field of Classification Search
CPC ...... G06V 30/10; G06V 30/12; G06V 30/127; G06V 30/133; G06V 30/00; G06V 30/148;
(Continued)

(56) References Cited

U.S. PATENT DOCUMENTS 10,769,360 B1 9/2020 Arnold et al.
2011/0200256 A1* 8/2011 Saubat ............... G06V 30/1448
382/195

(Continued)

FOREIGN PATENT DOCUMENTS

CN 111967387 A 11/2020
CN 112733645 A 4/2021
(Continued)

OTHER PUBLICATIONS

"Acrobat DC: Detecting Form Fields in a PDF", Retrieved from: https://www.abdn.ac.uk/toolkit/documents/uploads/acrobat-dc-form-fields.pdf, Jun. 9, 2021, 1 Page.

(Continued)

Primary Examiner — Atiba O Fitzpatrick
(74) Attorney, Agent, or Firm — Foley IP Law, PLLC

(57) ABSTRACT

The disclosure herein describes providing signature data of an input document. Text data of the input document is obtained (e.g., OCR data generated from image data) and a first set of signature fields are identified using signature key-value pairs of the text data. A first subset of signed signature fields and a first subset of unsigned signature fields are determined based on mapping to a set of predicted values. A second set of signature fields are determined using a region prediction model applied to image data of the input document. Region images associated with the first subset of unsigned signature fields and with second set of signature fields are obtained and a second set of signed signature fields and a second set of unsigned signature fields are determined (Continued)

using a signature recognition model. Signature output data is provided including signed signature fields and/or unsigned signature fields.

20 Claims, 7 Drawing Sheets

(51) Int. Cl.
    *G06F 40/284* (2020.01)
    *G06N 20/00* (2019.01)
    *G06V 30/146* (2022.01)
    *G06V 30/19* (2022.01)
    *G06V 30/414* (2022.01)
    *G06V 30/416* (2022.01)
(52) U.S. Cl.
    CPC .......... *G06N 20/00* (2019.01); *G06V 30/147* (2022.01); *G06V 30/19067* (2022.01); *G06V 30/416* (2022.01)
(58) Field of Classification Search
    CPC .... G06V 30/153; G06V 30/26; G06V 30/262; G06V 30/268; G06V 30/274; G06V 30/412; G06V 30/413; G06V 30/414; G06V 30/416; G06V 10/25–273; G06V 20/49; G06V 20/695; G06V 40/162; G06V 20/80; G06V 20/698; G06V 10/70; G06V 10/82; G06V 10/774–7796; G06T 2207/30176; G06T 7/10–194; G06T 2207/20021; G06T 2207/20112–20168; G06T 2207/20081; G06T 2207/20084; G06F 40/279; G06F 40/284; G06F 40/289; G06F 40/295; G06F 40/174; G06F 16/93; G06F 18/214–2155; G06F 7/023; G06F 40/16; A61B 5/7485; G06K 9/6224; G06K 9/6256; G06K 9/6257; G06K 9/6259; G06N 3/02–126; G06N 20/00–20
    See application file for complete search history.

(56) References Cited

U.S. PATENT DOCUMENTS

| | | | |
|---|---|---|---|
| 2014/0245120 A1* | 8/2014 | Schwartz | G06V 30/32 715/226 |
| 2014/0258826 A1 | 9/2014 | Barrus et al. | |
| 2014/0355835 A1* | 12/2014 | Rodriguez-Serrano | G06V 20/63 382/105 |
| 2018/0225508 A1* | 8/2018 | Lea | G06V 10/48 |
| 2019/0155892 A1* | 5/2019 | Dakin | G06F 40/274 |
| 2019/0294900 A1 | 9/2019 | Li et al. | |
| 2020/0074169 A1 | 3/2020 | Mukhopadhyay et al. | |
| 2020/0394357 A1* | 12/2020 | Banaszak | G06V 10/96 |
| 2021/0027292 A1 | 1/2021 | Farivar et al. | |
| 2021/0073514 A1* | 3/2021 | Sangala | G06F 18/22 |
| 2021/0124905 A1* | 4/2021 | Chen | H04L 9/3297 |
| 2022/0156300 A1* | 5/2022 | Paruchuri | G06N 3/08 |
| 2022/0237397 A1* | 7/2022 | Han | G06V 30/18057 |
| 2022/0292258 A1* | 9/2022 | Zeng | G06V 30/413 |
| 2023/0351115 A1* | 11/2023 | Zeng | G06F 40/284 |

FOREIGN PATENT DOCUMENTS

| | | |
|---|---|---|
| WO | 2017058252 A1 | 4/2017 |
| WO | 2021027336 A1 | 2/2021 |

OTHER PUBLICATIONS

"International Search Report and Written Opinion Issued in PCT Application No. PCT/US22/037952", Mailed Date: Nov. 10, 2022, 12 Pages.

Mshir, et al., "Signature recognition using machine learning", In Proceedings of 8th International Symposium on Digital Forensics and Security, Jun. 1, 2020, 4 Pages.

Zhu, et al., "Signature Detection and Matching for Document Image Retrieval", In Journal of IEEE Transactions on Software Engineering, vol. 31, Issue 11, Nov. 2009, 36 Pages.

* cited by examiner

ENTRY DETECTION AND RECOGNITION FOR CUSTOM FORMS

BACKGROUND

Processing documents, whether electronic documents or physical documents, presents a variety of challenges when those documents include and/or require values, such as signatures, user entries, and/or other types of entries, to be written or otherwise included in the documents. Manually verifying that documents include required entries, such as signatures, is a tedious and potentially error prone process. Automatic detection and verification of signatures has its own set of challenges due to the wide variety of different formats and/or structures used by document, due to the significant differences between signatures of different people, and due to the many different types of signatures that may be used (e.g., conventional signatures, images of conventional signatures, electronic signatures, signature formatting of regular text, etc.).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for providing entry data of an input document is described. A first set of entry fields of the input document are identified using entry key-value pairs of text data of the input document. A first subset of filled entry fields and a first subset of unfilled entry fields are determined based on mapping to a set of predicted values. Additionally, a second set of entry fields of the input document are determined using a region prediction model applied to the image data of the input document. Region images associated with each entry field of the first subset of unfilled entry fields and with each entry field of the second set of entry fields are obtained and a second set of filled entry fields and a second set of unfilled entry fields are determined using the obtained region images and an entry recognition model. Finally, entry output data is provided, wherein the entry output data includes at least one of the following: the first subset of filled entry fields, the second subset of filled entry fields, and the second subset of unfilled entry fields.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 7, the systems are illustrated as schematic drawings. The drawings may not be to scale.

DETAILED DESCRIPTION

Figure 1:
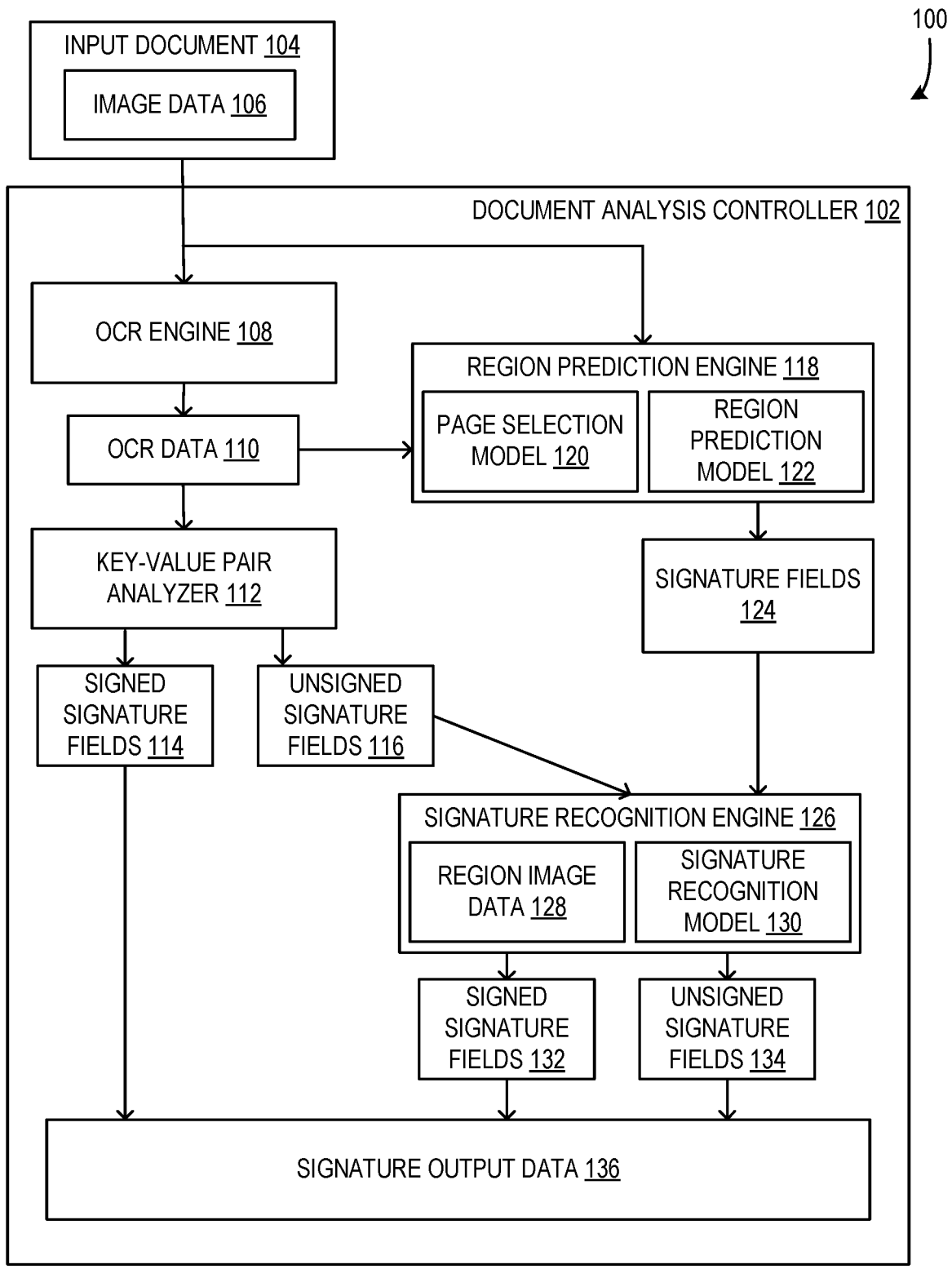
FIG. 1 is a block diagram illustrating an example system configured to provide signature output data of an input document.

Aspects of the disclosure provide a computerized method and system for analyzing input documents and providing output data indicating locations and/or statuses of entry fields in the input documents (e.g., signature fields or other fields prompting a user or other entity to provide a response). When an input document is received, text data, such as Optical Character Recognition (OCR) data, is obtained or generated if it is not already included with the input document. The text data is analyzed using entry key-value pairs to identify a first set of entry fields of the input document. Further, the entry key-value pairs are used to determine a first subset of filled entry fields and a first subset of unfilled entry fields (e.g., the first set of entry fields are classified as filled or unfilled using the entry key-value pairs). Additionally, image data of the input document is analyzed using a region prediction model to determine a second set of entry fields. Region images of the input document associated with the second set of entry fields and the first subset of unfilled entry fields are obtained and an entry recognition model is used to analyze the obtained region images to determine a second subset of filled entry fields and a second subset of unfilled entry fields. It should be understood that the first subset of unfilled entry fields is analyzed using both the entry key-value pairs and the entry recognition model, enhancing the accuracy of the entry detection process. Entry output data is provided in response to the input document in the form of entry field data including the first subset of filled entry fields, the second subset of filled entry fields, and/or the second subset of unfilled entry fields.

The disclosure operates in an unconventional manner at least by performing both text-based analysis using key-value pairs and image-based analysis using region prediction models on an input document to identify entry fields, such as signature fields, accurately and efficiently. Documents have a wide variety of different formats and, similarly, entries used to fill in and/or sign documents can vary significantly between different users and even between entry instances of the same user. The use of multiple types of analysis on both text-based data and image-based data substantially enhances the likelihood that entry fields will be automatically identified and reduces the chance that entry fields will be missed.

The disclosure is an end-to-end solution for entry detection and recognition in custom form documents. It introduces new labeling functionality for entry areas and pre- and post-processing to enhance the detection and recognition performance and to generate entry output data for customers that includes entry bounding boxes in a document as well as indications as to whether the entry fields are signed.

Further, the disclosure is designed to handle custom form documents particularly well. The technical advantages include generating and using a large-scale synthetic entry dataset to train an entry recognition model. This data set contains a variety of entry images with different backgrounds, surrounding content, styles, sizes, colors, etc., which makes the trained entry recognition model accurate and robust. Further, the described region prediction models and page selection models can be trained quickly and with relatively small training data sets, such that customers are enabled to provide only a few form documents in order to obtain accurate and customer-specific entry output data from the described system. Additionally, the developed module of the disclosure is relatively small and/or space-efficient, such that data storage space savings can be passed on to customers.

The disclosure provides an improvement in time and processing of documents. The two types of analysis can be performed in parallel and duplicate analysis of entry fields can be prevented. Thus, when an entry field is determined to be signed during the text-based analysis, the image-based analysis may be configured to refrain from processing that entry field, reducing the quantity of entry fields that must be processed using the described image-based analysis. Additionally, the disclosure provides improved accuracy of both entry field identification and entry recognition. The text-based analysis may catch an entry field that goes unidentified in the image-based analysis or vice versa. Further, an entry that the text-based analysis fails to recognize can then be recognized using the image-based analysis, avoiding an inaccurate result.

It should be understood that, while examples described herein specifically discuss identification of signature fields and recognition of signatures in those fields, in other examples, more, fewer, or different types of entry fields are identified and more, fewer, or different types of entry field values are recognized without departing from the description. In such examples, models used are trained to identify, recognize, or otherwise function with respect to the associated types of entry fields, rather than being specifically trained for use with signatures.

FIG. 1 is a block diagram illustrating an example system 100 configured to provide signature output data 136 of an input document 104. The system 100 includes a document analysis controller 102 that is configured to receive the input document 104, including image data 106 of the document 104, and to analyze and process the document 104 in several ways to identify signature locations in the document 104 and/or to determine whether signature locations in the document 104 have been signed or remain unsigned.

In some examples, the document analysis controller 102 is located on and/or executed on a computing device (e.g., a computing apparatus as described below with respect to FIG. 7, a personal computer, a server device, a mobile computing device, or the like). Alternatively, in other examples, the document analysis controller 102 and/or components thereof are distributed across multiple computing devices and those multiple computing devices are in communication with each other by one or more computer networks (e.g., an intranet, the Internet, or the like). For instance, in an example, the Optical Character Recognition (OCR) engine 108, the region prediction engine 118, and/or the signature recognition 126 are distributed across multiple networked computing devices and they are configured to communicate with each other over the network to share data.

Further, the document analysis controller 102 includes the OCR engine 108. The OCR engine 108 includes hardware, firmware, and/or software configured to receive the input document 104 (e.g., image data 106 of the document 104). The OCR engine 108 analyzes the document 104 data to generate OCR data 110, which includes text data that represents the text content of the input document 104. In some examples, the OCR engine 108 is configured to analyze the image data 106 to identify the presence of letters, words, and/or other types of text data. Alternatively, or additionally, OCR analysis is unnecessary as the input document 104 already includes text data. In such cases, processing the input document 104 includes obtaining the included text data and/or simple format conversion operations on the input document 104 to obtain the included text data.

Additionally, or alternatively, the document analysis controller 102 is configured to perform document layout analysis of the input document 104 (e.g., prior to performing OCR analysis using the OCR engine 108). In some examples, the document layout analysis includes identifying and/or categorizing regions of interest in the image data 106 of the input document 104. The document layout analysis generates output data that labels or otherwise categorizes zones of the image data 106 (e.g., labeling of different zones as text body zones, illustration zones, math symbols, tables, or the like). Additionally, or alternatively, the output data includes logical role labeling of regions of the image data 106, such as title regions, caption regions, footnote regions, or the like. In some examples, the OCR engine 108 is configured to use the output from the document layout analysis in addition to other data of the input document 104 to generate the OCR data 110 as described herein.

In some examples, the input document 104 is a form document or other type of document that includes one or more locations where readers may provide signatures (e.g., signature lines or boxes, initial lines or boxes, or the like). For instance, in an example, the input document 104 is a lease form that includes signature locations in which a lessee and/or lessor provide signatures. The input document 104 is an electronic document formatted as an image (e.g., Portable Network Graphics (PNG) format), formatted as a portable document (e.g., Portable Document Format (PDF)), or formatted according to a different electronic document format.

Additionally, the document analysis controller 102 includes a key-value pair analyzer 112. The key-value pair analyzer 112 includes hardware, firmware, and/or software configured to analyze the OCR data 110 and, based on that analysis, identify signature locations in the OCR data 110. Further, the key-value pair analyzer 112 is configured to determine whether identified signature locations have been signed (e.g., the location includes text that is recognized as a signature) or have not been signed (e.g., the location where the signature is expected is blank or it otherwise does not contain text recognized as a signature. As a result of is analysis, the key-value pair analyzer 112 generates a set of signed signature fields 114 and a set of unsigned signature fields 116.

In some examples, the key-value pair analyzer 112 includes a list or set of key-value pairs that represent text of the document that is indicative of a signature location. For instance, a key of a key-value pair includes text that prompts a reader to provide a signature in a nearby location in the document (e.g., form text on the document reads "Signature" and adjacent to the text is a line where a reader is prompted to sign). In such an example, a value of the key-value pair includes text located in the signature location near the key. The set of key-value pairs includes pairs of keys and values that are likely to indicate that the associated document location is a signature location and that the value is a valid signature.

In some examples, the key-value pair analysis includes identifying probable signature locations in the OCR data 110 by searching for keys of the set of key-value pairs in the OCR data 110 (e.g., 'signature', 'sign', 'sign here'). Upon identifying a key in the OCR data 110, the text data in proximity to the identified key is compared to the values of the set of key-value pairs to determine whether any of the nearby text data is likely to be a signature. In some examples, the values that are used for such analysis include specific name text and/or name text patterns that are compared to the text data in proximity to the identified key. For instance, if text data includes the two words 'John Smith' nearby an identified key, those two words are determined to be a signature because they are both names in the values of the set of key-value pairs (e.g., the values of the set of key-value pairs may include a dictionary of common first and last names). Additionally, or alternatively, if the text data near the identified key does not include common first and/or last names, the name text patterns are used to determine whether any of the text data is likely to be a signature. For instance, if a signer has an uncommon name, the key-value pair analyzer 112 is configured to identify the uncommon name due to the name being two words long, the name not including common words, and/or other factors or patterns that are indicative of a signature in the OCR data 110.

Additionally, or alternatively, the key-value pair analyzer 112 is configured to values likely to be signatures first and then, upon finding a potential signature value, determining whether a key is included in the OCR data 110 near the potential signature. In other examples, other methods of key-value pair analysis are used without departing from the description herein.

The signed signature fields 114 include signature locations of the input document 104 that are identified as signed in the OCR data 110 by the key-value pair analyzer 112. The signed signature fields 114 include key-value pair text data at specific locations in the OCR data 110, which can be traced back to the original input document 104.

The unsigned signature fields 116 include signature locations of the input document 104 that are identified as lacking signatures in the OCR data 110 by the key-value pair analyzer 112. In some examples, a field of the unsigned signature fields 116 refers to a signature location in the input document 104 that does not have a signature. Additionally, or alternatively, a field of the unsigned signature fields 116 refers to a signature location in the input document 104 that includes a signature that was not legible or otherwise identifiable by the OCR engine 108. In such cases, if the OCR engine 108 is unable to interpret image data in a location of the document 104, the image data is not included as text data in the OCR data 110. Thus, a signature that has been written on the input document 104 but that is not interpretable by the OCR engine 108 is not identified as a signed signature field 114 by the key-value pair analyzer 112. To enable such a signature to be recognized, the unsigned signature fields 116 (e.g., OCR text data and/or data indicating a location of the field in the input document 104) from the key-value pair analyzer 112 are sent to the signature recognition engine 126 for additional analysis, as described below.

The region prediction engine 118 includes hardware, firmware, and/or software configured to predict or otherwise identify signature regions of the input document 104 based on the image data 106 and/or the OCR data 110. In some examples, the region prediction engine 118 includes two trained models. The trained models include a page selection model 120 and a region prediction model 122. The page selection model 120 is configured to analyze data associated with each page of the input document 104 (e.g., image data 106, OCR data 110, and/or other types of data associated with the page) and based on that analysis, to determine whether the analyzed page is likely to include a signature region. Additionally, or alternatively, the page selection model 120 is applied to each page of the input document 104 to eliminate pages that are unlikely to include a signature region from consideration when using the region prediction model 122. For instance, if a document has 50 pages and the page selection model 120 is used to identify five pages that are likely to have signature regions and to eliminate the other 45 pages from consideration, the region prediction engine 118 is configured to apply the region prediction model 122 to only the identified five pages. This reduces the quantity of region prediction model 122 analysis (e.g., such analysis may be more resource-intensive or otherwise expensive than the operation of the page selection model 120) that is performed on the input document 104.

The region prediction model 122 is configured to analyze a page of the input document 104 (e.g., image data 106, OCR data 110, and/or other types of data associated with the page) and to determine whether any region of the page is a signature region. In some examples, the region prediction model 122 is trained to identify anchors, text-based patterns, and/or image-based patterns within the page being analyzed and to determine the location of any signature region in the page based on those anchors and/or patterns. Further, the region prediction model 122 is configured to identify signature regions on the page based on distance between and direction from the identified anchors or patterns. The signature regions identified by the region prediction model 122 are output by the region prediction engine 118 as signature fields 124. In some examples, signature fields 124 include data that identifies a page on which each signature field is located and associated data that indicates where on the page the signature field is located. Additionally, or alternatively, the signature fields 124 include data indicating the size and/or shape of the signature region. For instance, in an example, a signature field 124 describes a rectangular signature region bounding box by indicating a page number, vertical and horizontal coordinates of the upper left corner of the region, and length and width values of the region. Additionally, or alternatively, the signature fields 124 lack an indication of whether the field is signed or unsigned, as that determination is made by the signature recognition engine 126 as described below.

In other examples, other methods of predicting signature regions in the input document 104 by the region prediction engine 118 are used without departing from the description. Further, the training of the models 120 and 122 are described in greater detail below with respect to FIGS. 2 and 3.

The signature recognition engine 126 includes hardware, firmware, and/or software configured to analyze image data, text data, and/or other types of data of the input document 104 to determine whether a signature is present in a signature field. In some examples, the signature recognition engine 126 primarily analyzes region image data 128 from the image data 106 that is associated with signature fields (e.g., unsigned signature fields 116 and/or signature fields 124) using a signature recognition model 130 to determine whether signatures are present in the fields and generate signed signature fields 132 and/or unsigned signature fields 134.

In some examples, the signature recognition engine 126 receives the unsigned signature fields 116 from the key-value pair analyzer 112 and the signature fields 124 from the region prediction engine 118. As described above, the unsigned signature fields 116 have either no signature or a signature that is not legible or otherwise interpretable to the OCR engine 108. Thus, the signature recognition engine 126 represents a second method of signature recognition being applied to the unsigned signature fields 116 after the first method applied by the key-value pair analyzer 112. Additionally, or alternatively, the signature fields 124 do not include any indication of the presence of signatures because the region prediction engine 118 is configured to predict and/or identify locations of signature fields and it does not engage in any signature recognition analysis.

Further, in some examples, the document analysis controller 102 is configured to identify overlapping fields between the signed signature fields 114, the unsigned signature fields 116 and the signature fields 124. If overlapping fields are identified, the controller 102 is configured to process a single instance of that field. For instance, if an unsigned signature field 116 is identified by the key-value pair analyzer 112 and a signature field 124 associated with the same signature region is identified by the region prediction engine 118, the controller 102 alters the input to the signature recognition engine 126 to only include one instance of that overlapping field. Alternatively, or additionally, if a signed signature field 114 overlaps with a signature field 124 from the region prediction engine 118, the controller 102 is configured to remove the signature field 124 from the input to the signature recognition engine 126 as a signature has already been recognized in the field 114 by the key-value pair analyzer 112.

The region image data 128 include image data for signature regions associated with each of the unsigned signature fields 116 and signature fields 124 that are provided to the signature recognition engine 126 for analysis. In some examples, the region image data 128 for each field is obtained from the image data 106 of the input document 104 and based on region indicators or other data of each of the input fields. For instance, in examples where each signature field 124 includes data values that define a page number and/or signature region in the input document 104, those data values are used by the signature recognition engine 126 to obtain region image data 128 associated with the defined signature region.

The signature recognition model 130 is configured to analyze the region image data 128 and determine whether a signature is present in the region or not. In some examples, the signature recognition model 130 is trained using machine learning techniques and training data including a wide variety of different types of signatures. For instance, in some examples, the training data includes handwritten signatures in cursive or printed text, digital fonts that mimic handwritten signatures, and/or other types of digital fonts. Additionally, or alternatively, the training data includes negative examples as well, such as signature regions that are empty or lack a signature, document text that is not associated with a signature region, and/or signature regions that include non-signature markings, such as various organizations of dots, drawings that are obviously not signatures, or other types of markings.

In some examples, the training data used to train the signature recognition model 130 includes real signatures and/or synthetic signatures that have been generated based on aspects of real signatures. The training data further includes a variety of different features, including signature regions with different backgrounds, surrounding content, styles, sizes, colors, or other features. Additionally, or alternatively, the training data includes region image data that has non-signature data, such as key text, lines, or other text surrounding the area where the signature is intended to be placed in the region. Thus, the model 130 is trained to recognize that empty form text in the region image data 128 does not indicate the presence of a signature in that region. Further, the model 130 is trained recognize signatures even in region image data 128 where a written signature overlaps some of the form text.

In some examples, the model 130 is trained using machine learning techniques. The training of the model 130 includes machine learning techniques that use, for instance, a trained regressor such as a random decision forest, a directed acyclic graph, a support vector machine, a convolutional neural network, or other neural network, or another trained regressor. Additionally, or alternatively, the training of the model 130 makes use of training data including the region image data with the features described above associated with indications of a present signature or absent signature as training data pairs when applying machine learning techniques and/or algorithms. Millions of training data pairs (e.g., a large synthetic signature dataset) may be stored in a machine learning data structure (e.g., of the system 100) for use in training the model 130 and/or other trained models as described herein.

Further, in some examples, the signature recognition model 130 is supervised and trained using deep learning. A large synthetic signature dataset is generated and the signature recognition model 130 is trained therewith, such that the model 130 is accurate and efficient at detecting valid signatures in region image data of input documents.

Additionally, or alternatively, the signature recognition model 130 is configured as an Open Neural Network Exchange (ONNX) model. In other examples, the signature recognition model 130 is a different type of model without departing from the description.

The document analysis controller 102 is configured to generate and/or populate a set of signature output data 136 based on the analysis of the input document 104. In some examples, the signature output data 136 includes signature fields from one or more of the signed signature fields 114, the signed signature fields 132, and/or the unsigned signature fields 134. In such examples, the signature output data 136 is not populated with the unsigned signature fields 116 from the key-value pair analyzer 112 because those fields 116 are then processed using the signature recognition engine 126 and will become fields in either the signed signature fields 132 or the unsigned signature fields 134.

In some examples, the signature output data 136 is configured and/or formatted to be used and/or viewed in the context of the input document 104. For instance, in an example, the signature fields in the signature output data 136 include region location data associated with the input document 104 and those regions of the document are highlighted or otherwise indicated based on the signature output data 136. Additionally, or alternatively, the highlighting or other indications include indications of whether each indicated signature field is signed or unsigned (e.g., color-coded highlighting where signed signature fields are highlighted in a green color and unsigned signature fields are highlighted in a red color).

Further, in some examples, the signature output data 136 is configured and/or formatted to enable efficient navigation of the input document 104 based on the locations of the signature fields of the signature output data 136. For instance, in an example, when viewing the input document 104 in the context of the signature output data 136, a viewer is enabled to activate a button to navigate the document to the next signature field in the document and/or the previous signature field in the document. Additionally, or alternatively, the signature output data 136 enables such a viewer to navigate to the next unsigned signature field, the next signed signature field, the previous unsigned signature field, and/or the previous signed signature field.

Figure 2:
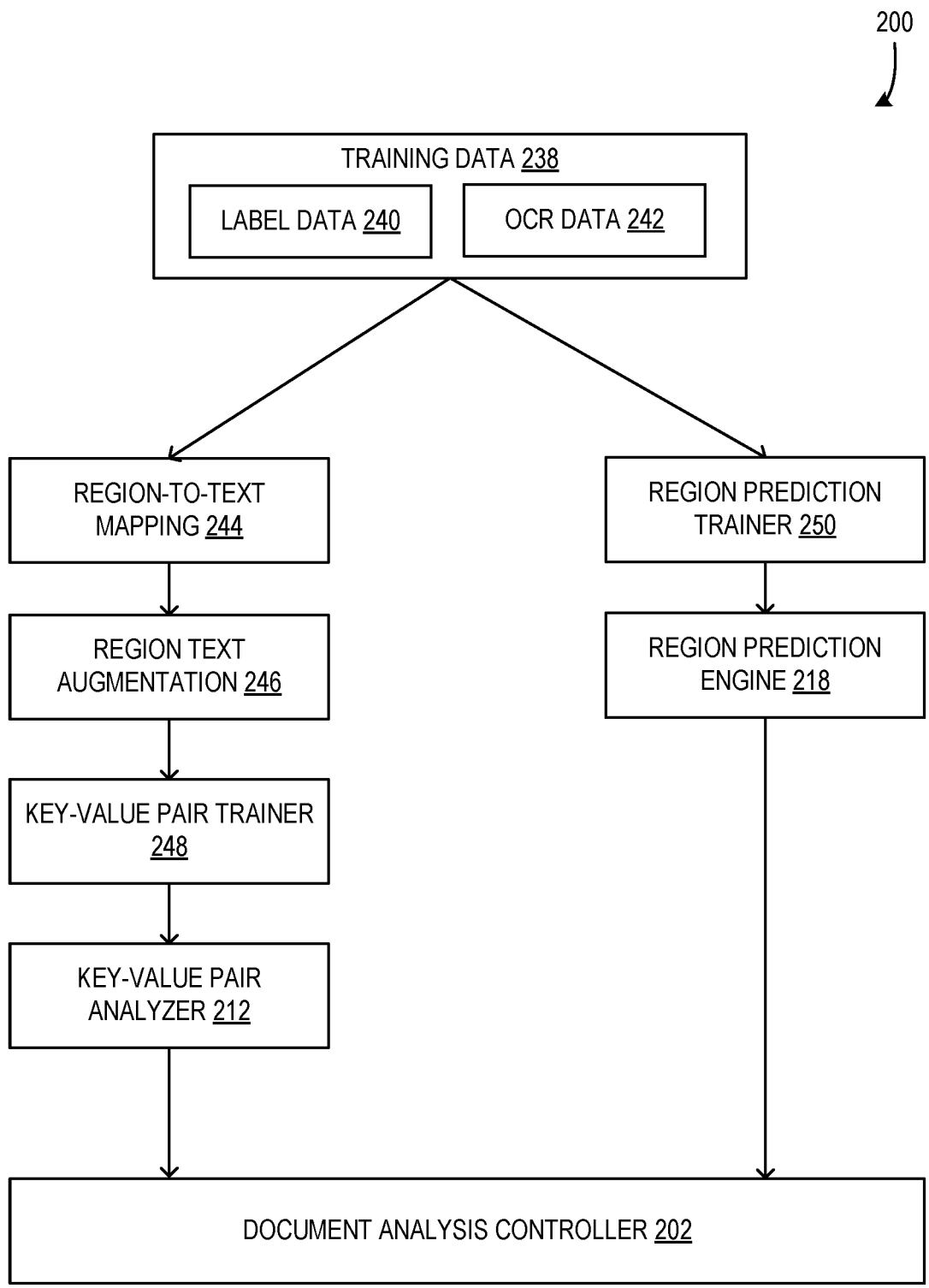
FIG. 2 is a block diagram illustrating a system configured to train a key-value pair analyzer and a region prediction engine of a document analysis controller using training data.

FIG. 2 is a block diagram illustrating a system 200 configured to train a key-value pair analyzer 212 and a region prediction engine 218 of a document analysis controller 202 using training data 238. In some examples, the system 200 is part of or interacts with a system such as system 100 of FIG. 1 as described above.

In some examples, the system 200 includes hardware, firmware, and/or software configured to receive training data 238, including label data 240 and/or OCR data 242 and to use the training data 238 to train the key-value pair analyzer 212 and/or the region prediction engine 218 of the document analysis controller 202. The system 200 is configured to use the training data 238 to perform region-to-text mapping 244, region-based text augmentation 246, and a key-value pair trainer 248 to train the key-value pair analyzer. Further, the system 200 is configured to use the training data 238 with a region prediction trainer 250 to train the region prediction engine 218. The region prediction trainer 250 is described in greater detail below with respect to FIG. 3.

Further, in some examples, the training data 238 includes training documents. The training documents include label data 240 such as labeled bounding boxes of the document image that divide the document image into portions. Label data 240 of a bounding box includes an indication of whether the bounding box defines a signature region or a non-signature region. Additionally, or alternatively, the label data 240 includes an indication of whether the associated signature region includes a signature or that a signature is missing.

Additionally, in some examples, the training documents include OCR data 242 such as OCR text data of the training documents. The OCR data 242 is used in combination with the label data 240 of the bounding boxes to perform region-to-text mapping 244. The region-to-text mapping 244 process includes mapping the labeled bounding boxes to OCR text elements and using the mappings to generate ground truths for use by the key-value pair trainer 248.

In some examples, the training documents of the training data 238 are provided by a single customer or other entity, such that the key-value pair analyzer 212 and region prediction engine 218 are trained to identify signature regions in documents associated with that single entity. For instance, such training documents are set of form documents used by the entity with matching or similar structures or word patterns. In such examples, the system 200 is configured to train separate key-value pair analyzers 212 and region prediction engines 218 for each customer based on the provided training documents.

Further, in some examples, region text augmentation 246 is performed on the training documents of the training data 238. In cases where labeled bounding boxes of the training documents do not include OCR text data of a signature, it is still desirable to use those signature regions as training data. Text in such regions is augmented to include synthetic signatures and/or signature-like text (e.g., one or a few words in a line) for use in the training process.

The key-value pair trainer 248 is configured to train the key-value pair analyzer 212 to identify signed and unsigned signature fields based on OCR data, as described above with respect to the key-value pair analyzer 112 of FIG. 1. In some examples, the key-value pair trainer 248 uses the OCR text in the mapped regions from the region-to-text mapping 244 and/or region text augmentation 246 processes as training key-value pairs. For instance, a labeled bounding box of a signature region that includes OCR text of 'Signature' followed by 'John Doe', this mapped data is used as a key-value pair in which the key is 'Signature', and the value is 'John Doe'.

Additionally, or alternatively, the key-value pair trainer 248 trains the key-value pair analyzer 212 to perform key-value pair analysis on OCR text data and/or other document data using machine learning techniques (e.g., the machine learning techniques described above with respect to the training of the signature recognition model 130 of FIG. 1).

Figure 3:
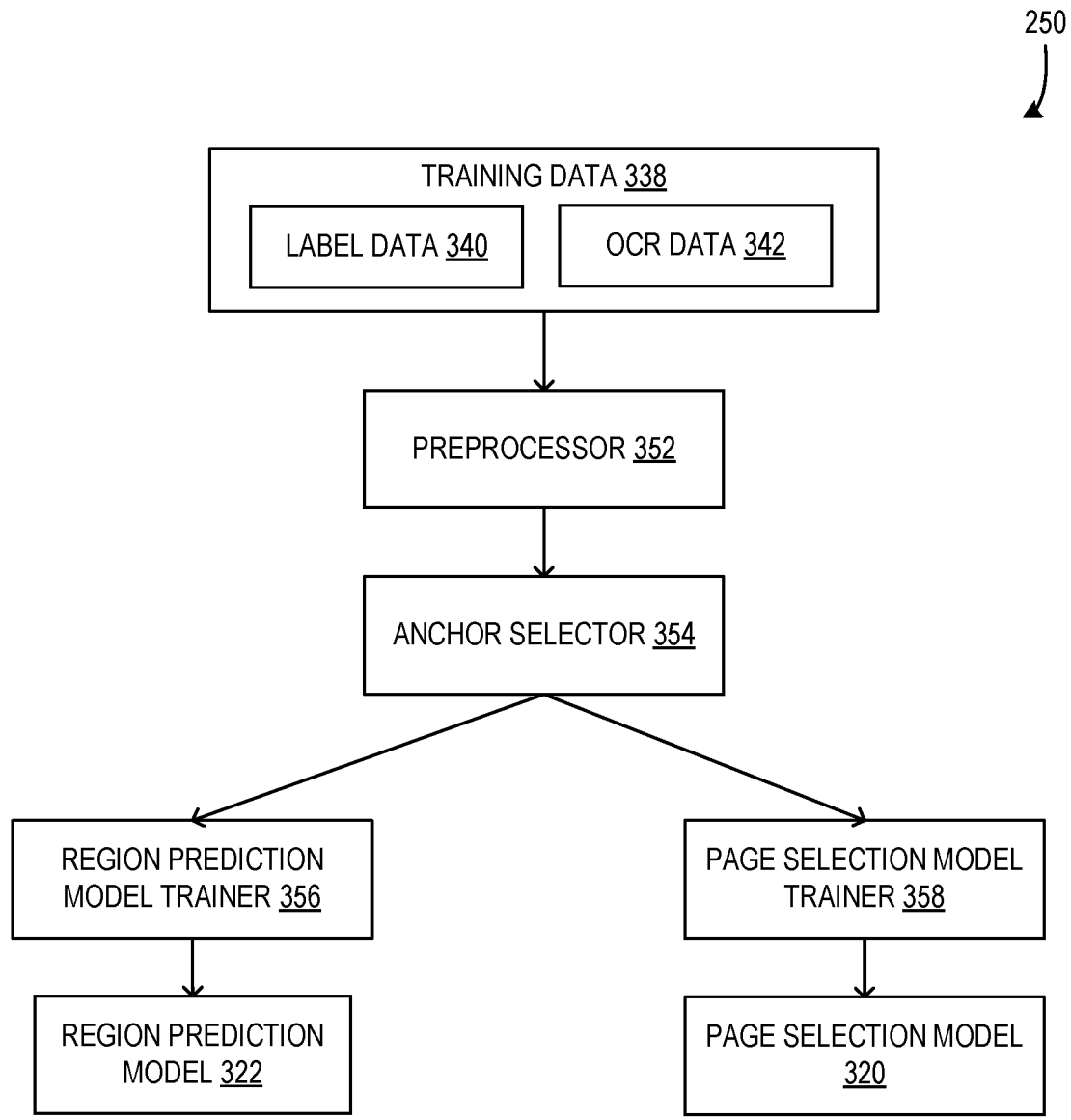
FIG. 3 is a block diagram illustrating a system configured to train a region prediction engine, including a region prediction model and a page selection model, using training data.

FIG. 3 is a block diagram illustrating a region prediction trainer 250 configured to train a region prediction engine (e.g., the region prediction engine 118, 218), including a region prediction model 322 and a page selection model 320, using training data 338. In some examples, the region prediction trainer 250 is part of a system such as system 200 as described above with respect to FIG. 2. Further, in some examples, the trained region prediction model 322 and the trained page selection model 320 are included in a system such as system 100 as described above with respect to FIG. 1.

The training data 338 is substantially the same training data as the training data 238 described above with respect to FIG. 2. The training data 338 includes label data 340 (e.g., labeled bounding boxes of signature regions and/or non-signature regions) and/or OCR data 342 and/or other similar text data of training documents.

The preprocessor 352 includes hardware, firmware, and or software configured to process the label data 340 and/or OCR data 342 into configurations or formats that are compatible with other components of the region prediction trainer 250. In some examples, the training labels of the label data 340 and training OCR files of the OCR data 342 are converted from input ground truth data into data formatted to be compatible with the internal components of the region prediction trainer 250.

The anchor selector 354 includes hardware, firmware, and/or software configured to determine the location of and/or otherwise identify anchors in the training data 338. In some examples, anchors include text lines or other features of the training documents that are part of a form template or other pattern of the training documents that are substantially consistent across multiple training documents. Such anchors include form labels of lines of the documents, heading text of the documents, corners or other specific portions of tables or other non-text features of the documents, or the like.

In some examples, the anchor selector 354 is configured to select identified anchors using for use by the region prediction model trainer 356 and/or the page selection model trainer 358. The anchor selector 354 selects anchors using a proximity score that is based on distance between anchor instances and all signature bounding boxes. The anchors selected provide consistent details and or patterns across multiple documents that can be used to locate the signature bounding boxes relative to the locations of the selected anchors.

Further, in some examples, the region prediction engine is trained for signature prediction and/or detection using point-grid classification of points as belonging to a signature region or a non-signature region. Using the training documents of the training data 338, the region prediction trainer 250 identifies the stable anchors across labeled example forms and learns the location of signature regions with supervision from the labels in a relatively short amount of time and using a relatively small quantity of training documents. Given new training documents of the same or similar structures, the trained region prediction engine is configured to locate signature regions accurately and efficiently, as described herein.

The region prediction model trainer 356 is configured to use the training data 338 and/or anchors selected by the anchor selector 354 to train the region prediction model 322 using machine learning techniques. In some examples, the region prediction model trainer 356 uses sample points on pages of the training documents, such as corners of OCR text instances and/or points in or around labeled signature regions, as training data when training the region prediction model 322. Further, sample points are collected in a uniform grid across entire training documents. Absolute positions and/or relative positions of the sample points with respect to the selected anchors are used as training features by the region prediction model trainer 356. The sample points that are inside labeled signature regions are labeled as being inside those signature regions, while other sample points are labeled as not being inside signature regions. These labeled points are then used to train the region prediction model 322. Additionally, or alternatively, in other examples, other training data 338 is used to train the region prediction model 322 without departing from the description.

Further, in some examples, the region prediction model 322 is trained and configured to include a region prediction sub-model for each signature field of the training data 338. As a result, the region prediction model 322 is configured to analyze input documents to identify signature fields with each region prediction sub-model, such that different anchors and/or other document patterns are used to identify each type of signature field in the input documents.

The page selection model trainer 358 is configured to use the training data 338 and/or anchors selected by the anchor selector 354 to train the page selection model 320 using machine learning techniques. In some examples, the page selection model trainer 358 is configured to extract features from each page of the training documents based on the identified anchors. For each anchor from a list of selected anchors, the quantity of anchor instances on each page is analyzed, providing multiple anchor counts for the page. The anchor counts are used in conjunction with the known signature fields/regions as training data to train the page selection model 320. In some examples, a set of anchor counts on a page is linked with a signature field as a training data pair. For instance, if pages of training data that have three instances of anchors of type A, four instances of anchors of type B, and five instances of anchors of type C tend to also include a signature field of type X, the page selection model trainer 358 using that training data trains a page selection model 320 to determine that analyzed pages with that anchor count pattern (e.g., three instances of anchors of type A, four instances of anchors of type B, and five instances of anchors of type C) are likely to include the signature field of type X.

Additionally, or alternatively, the page selection model 320 is configured and trained to analyze pages of input documents and determine whether a page has or is likely to have a signature field. The page selection model 320 can be used to analyze all pages of a document and based on that analysis, to eliminate pages that do not or are not likely to have a signature field from further analysis by the region prediction model 322 as described herein. Thus, using the page selection model 320 in this manner results in the pages analyzed by the region prediction model 322 being likely to include a signature field, reducing the quantity of pages that must be processed by the region prediction model 322 and reducing the chances of false positive results being produced by the region prediction model 322.

Further, in some examples, the page selection model 320 is trained and configured to include a page selection sub-model for each signature field of the training data 338. As a result, the page selection model 320 is configured to analyze input documents to identify pages and the presence of associated signature fields with each page selection sub-model, such that different anchors and/or other document patterns are used to identify each type of signature field in the input documents.

Figure 4:
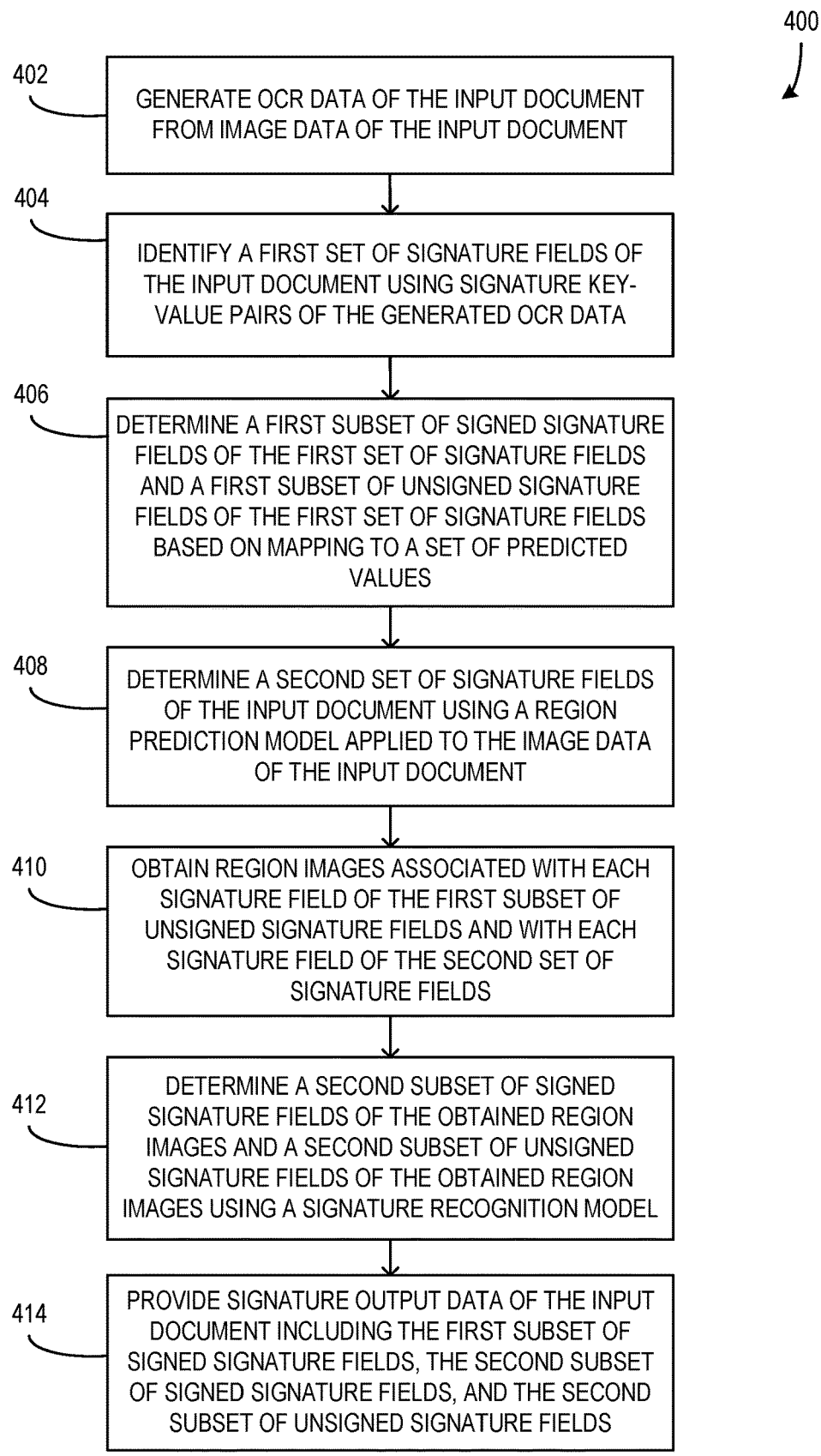
FIG. 4 is a flowchart illustrating a computerized method for providing signature output data of an input document.

FIG. 4 is a flowchart illustrating a computerized method 400 for providing signature output data (e.g., signature output data 136) of an input document (e.g., input document 104). In some examples, the method 400 is executed or otherwise performed on a system such as system 100 of FIG. 1. At 402, OCR data of the input document is generated from image data of the input document. The OCR data includes text data that is derived from an analysis of the image data of the input document. Additionally, or alternatively, the generation of the OCR data includes performing document layout analysis and the results of that analysis being used during the generation of the OCR data. In other examples, the input document includes OCR data or other similar text data, such that the generation of the OCR data is unnecessary.

At 404, a first set of signature fields of the input document is identified using signature key-value pairs of the generated OCR data. In some examples, the first set of signature fields are identified by a key-value pair analyzer 112 as described herein.

At 406, A first subset of signed signature fields and a first subset of unsigned signature fields are determined from the first set of signature fields based on mapping to a set of predicted values. Identifying and/or determining signed or unsigned categories of the first set of signature fields includes identifying keys and/or values in the OCR text data of the input document and then mapping those identified keys and/or values to predicted or otherwise known key-value pairs. If the text data of the input document sufficiently matches the predicted key-value pairs, a signature field is considered to be identified and included in the first set of signature fields. In some examples, such matching requires an exact match of key text and associated value text to a predicted key-value pair. An example of such an exact match includes the word "Signature" followed by a common name such as "John" which exactly matches a predicted key-value pair of ("Signature", "John"). Alternatively, in other examples, matching requires that key text and/or value text in the input document to exceed a matching threshold for patterns of predicted key-value pairs, such that non-exact matches that exceed the threshold are sufficient. An example of such a threshold match includes the word "Signature" followed by a word that is within a defined 80% threshold of a common name such as "Alexondra", which includes eight of nine letters (89%) of "Alexandra" in the correct order (this could occur due to alternate spellings of name and/or if text processing inaccurately detects different letters than what is written, such as by detecting an 'o' instead of an 'a' in Alexander's signature). In other examples, other thresholds and/or methods of matching are used without departing from the description.

At 408, a second set of signature fields of the input document is determined using a region prediction model applied to the image data of the input document. In some examples, other data, such as OCR text data or layout data of the input document are also used by the region prediction model.

Further, in some examples, the determination of the second set of signature fields is performed by a region prediction engine 118, including a page selection model 120 and a region prediction model 122 as described herein. The page selection model 120 predicts or otherwise identifies pages of the input document that include signature regions or are likely to include signature regions and the region prediction model 122 analyzes those identified pages for signature regions. Thus, the second set of signature fields is generated from the predicted pages of the page selection model 120 and the resulting identified signature fields from the region prediction model 122.

Additionally, or alternatively, duplicate signature fields in the first and second sets of signature fields are identified, and those duplicate signature fields are removed from the second set of signature fields. As a result, all signature fields identified by the key-value pair analysis are processed to determine a signed or unsigned category. Signed signature fields of the first set of signature fields are not processed further and need not be included in the second set of signature fields for the described image-based processing. Alternatively, the unsigned signature fields of the first set of signature fields are additionally included with the second set of signature fields for image-based processing.

Further, in some examples, determining the second set of signature fields of the input document using the region prediction model includes identifying anchors of a set of anchors with which the region prediction model was trained in the input document and, based on locations of the identified anchors, determining a set of points in the input document associated with the second set of signature fields.

At 410, region images associated with each signature field of the first subset of unsigned signature fields and with each signature field of the second set of signature fields are obtained. At 412, a second subset of signed signature fields and a second subset of unsigned signature fields are determined from the obtained region images using a signature recognition model.

At 414, signature output data of the input document is provided, including the first subset of signed signature fields, the second subset of signed signature fields, and/or the second subset of unsigned signature fields.

Figure 5:
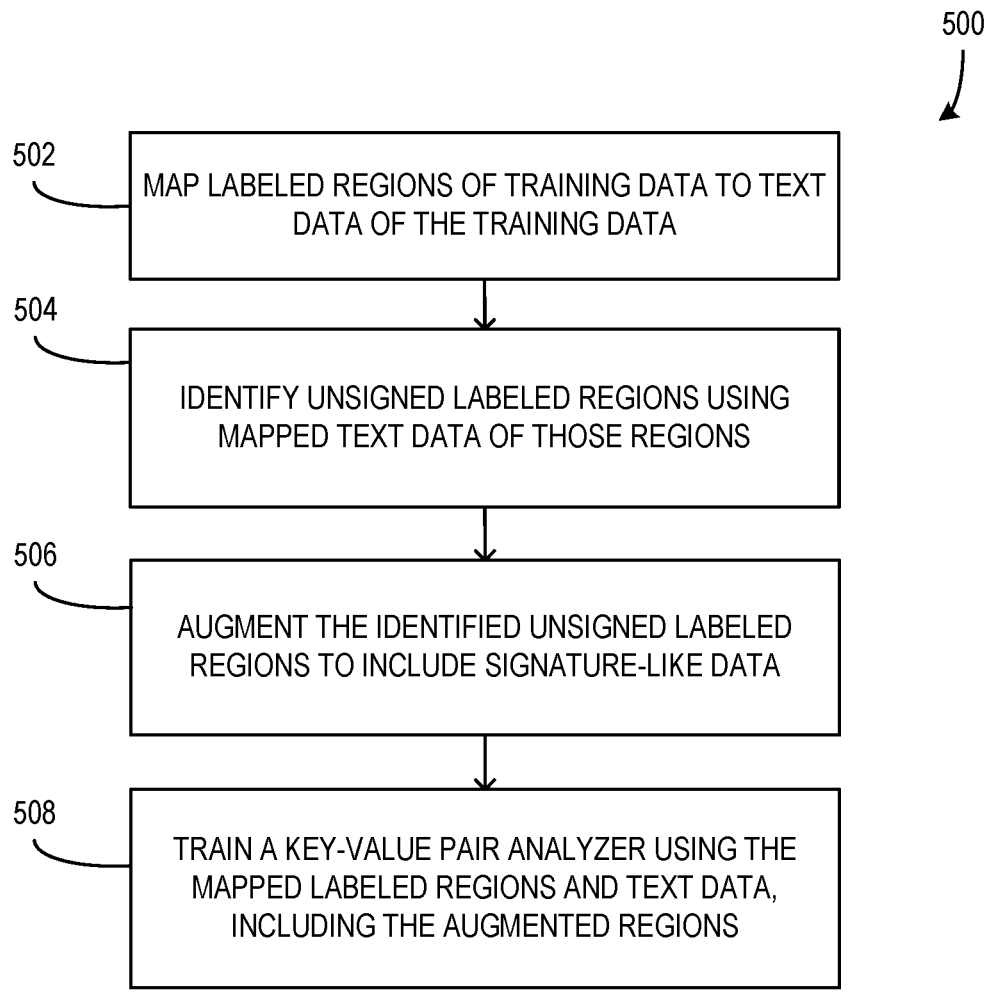
FIG. 5 is a flowchart illustrating a computerized method for training a key-value pair analyzer.

FIG. 5 is a flowchart illustrating a computerized method 500 for training a key-value pair analyzer (e.g., key-value pair analyzer 112). In some examples, the method 500 is executed or otherwise performed by a system such as system 200 of FIG. 2. At 502, labeled regions of training data are mapped to text data of the training data. In some examples, the labeled regions are provided by the provider of the training data and/or the text data of the training data is OCR data based on an OCR process performed on image data of the documents in the training data. For instance, a customer provides a set of form documents for use as training data and those form documents include labeled regions indicating where the signature fields of the form documents are located and text data indicating the content of the form documents. Additionally, or alternatively, in instances where the customer does not provide text data, the method 500 includes initially performing an OCR process on the provided training data to generate OCR data for use in the method 500.

Further, in instances where a customer does not provide labeled regions in the training data, the method 500 includes initially performing analysis of the training data using localization analysis to determine the locations of signature regions in the training data. For instance, localization analysis includes understanding a training document and locating all possible signature regions in the document with keys such as 'sign', 'signature', 'sign here', or the like.

At 504, unsigned label regions are identified using the mapped text data of those regions. In some examples, text in the labeled signature fields is analyzed to determine whether signature text (e.g., signature data that is legible or otherwise interpretable as text by OCR processes or the like) is present in the signature fields. For instance, such analysis compares text in a labeled signature field to signature text patterns and, if the text in the signature fields matches the signature text patterns to a sufficient degree, the signature field is considered to be signed. Alternatively, if the signature field does not include signature text and/or the text in the signature field does not match the signature text patterns, the signature field is considered to be unsigned.

At 506, the identified unsigned labeled signature regions are augmented to include signature-like text data. In some examples, the augmentation process includes inserting text that matches signature text patterns to a sufficient degree (e.g., text of one or two words, text of a length similar to signature text patterns, text including common names, or the like).

At 508, a key-value pair analyzer is trained using the mapped labeled regions and text data, including the augmented regions. In some examples, regions and text data associated with signed signature fields, including the augmented regions, are used to train the analyzer to recognize key-value pairs that are associated with signed signature fields. Additionally, or alternatively, the regions and text data associated with unsigned signature fields, such as instances of signature fields before augmentation at 506, are used to train the analyzer to recognize key-value pairs that not associated with signed signature fields. In other examples, other methods of training the key-value pair analyzer are used in association with the training data without departing from the description.

Figure 6:
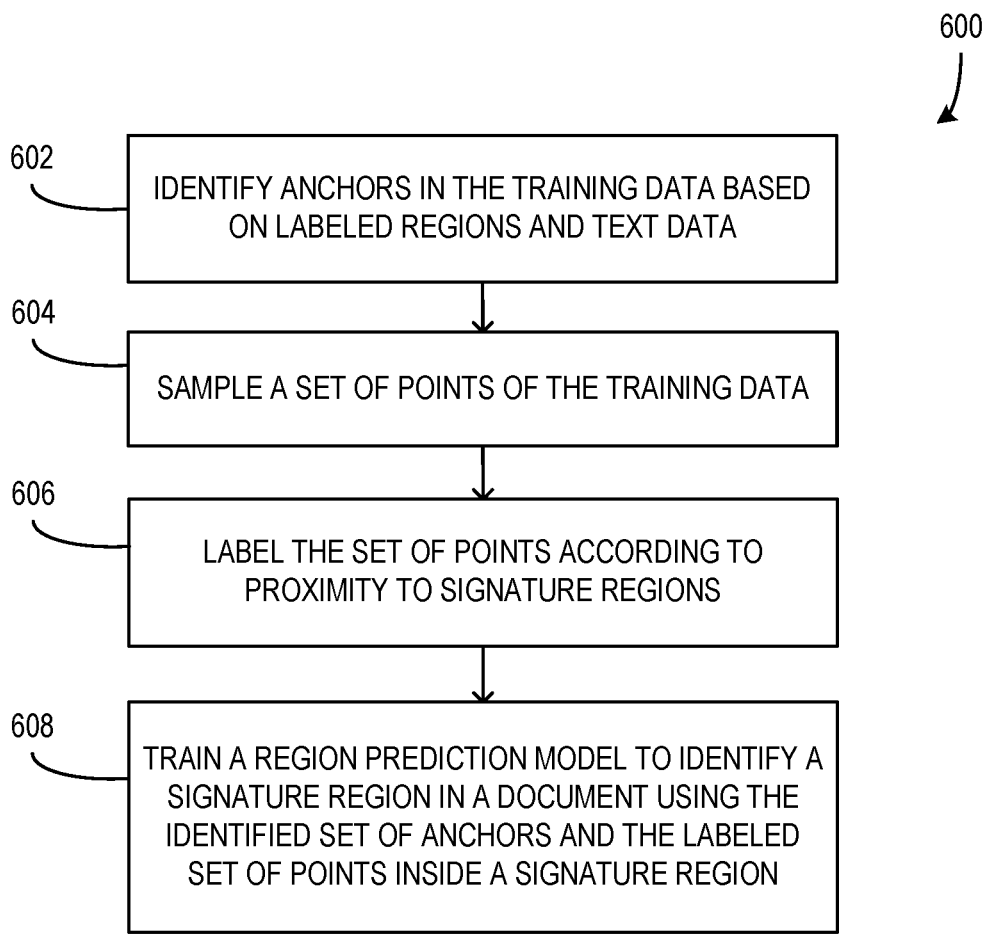
FIG. 6 is a flowchart illustrating a computerized method for training a region prediction model.

FIG. 6 is a flowchart illustrating a computerized method 600 for training a region prediction model (e.g., region prediction model 122). In some examples, the method 600 is executed or otherwise performed by a system such as systems 200 and 300 of FIGS. 2 and 3 respectively. At 602, anchors are identified in the training data based on labeled regions and text data of the training data. In some examples, anchors are identified for each training document of the training data, including corresponding anchors for each type of form of the training documents. For instance, anchors are fields and/or associated words or other patterns that appear in the training documents when they are empty forms or otherwise unsigned documents. Other types of identified anchors include visual cues such as, for example, visual features, table corners, or the like.

At 604, a set of points is sampled from the training documents of the training data and, at 606, the set of points are labeled according to proximity to signature regions. In some examples, the labeled points are labeled as being in a signature region or not in a signature region. Additionally, or alternatively, points are labeled to indicate a distance and/or direction from a particular signature region (e.g., a point that is labeled as being to the left of a signature region and/or a point that is labeled as being 1.5 inches away from the signature region).

At 608, the region prediction model is trained to identify signature regions in a document using the identified set of anchors and the labeled set of points inside signature regions. In some examples, the region prediction model includes sub-models, with each sub-model being trained to identify a specific signature region as described herein. For instance, a sub-model that is trained to identify a particular signature region or type of signature region is trained to identify anchors that are associated with the signature region and points inside the signature region relative to the identified anchors.

In other examples, the region prediction model is trained to identify signature regions using other methods without departing from the description. For instance, in some examples, instead of or in addition to identifying anchors relative to signature regions, the region prediction model is trained using text token matching and/or template matching based on the training documents.

Additional Examples

In an example, a customer provides a set of form documents for use as training data to the described system. The form documents include text data and image data, and the signature regions therein are provided as labels. The form documents are analyzed to identify anchors therein that are in proximity to the labeled signature regions. Further, sampled points of the form documents are analyzed and labeled relative to the signature regions and the anchors as described herein. The anchors, the labeled signature regions, and the labeled points represent the training data to be used.

The training data is used to train a region prediction model and a page selection model that includes page selectors associated with each signature field. Each page selector is trained to determine whether an associated signature field is or is likely to be on a given page. The region prediction model is trained to identify anchors and/or other features of a page of an input document and, based on those anchors and/or features, the model determines the location of any signature filed on the page, as described herein. Further, the training data is used to train a key-value pair analyzer that is specific to the customer as described herein.

Once the region prediction model and page selectors are trained using the customer's provided form documents. The system is ready to receive input documents from that customer. The system is configured to analyze input documents from that customer using the customer-specific trained region prediction model, page selectors, and key-value pair analyzer. Upon receiving a document from the customer, the system performs OCR analysis to obtain text data of the document. In other examples, text data is provided by the customer, such that the OCR analysis can be skipped. The text data is analyzed using the customer-specific key-value pair analyzer and a set of signature fields is identified or otherwise determined in the document based on this analysis. Those signature fields are then labeled as being signed or unsigned based using the key-value pair analyzer. Signed means that the analyzer identified a signature in the text data. Unsigned means that the signature field is empty or otherwise lacks a signature, or that the OCR analysis failed to interpret a signature such that it was omitted from the text data of the document.

Further, image data of the input document is analyzed by a region prediction engine that includes both the region prediction model and the page selection model. The signature fields identified in this manner are compared with those identified using the key-value pair analyzer and any duplicate signature fields are eliminated from the signature fields identified by the region prediction engine.

The unsigned signature fields from the key-value pair analyzer and the signature fields from the region prediction engine are analyzed using a signature recognition engine that includes a trained signature recognition model. The signature recognition engine obtains region image data for each signature field and the signature recognition model is trained to determine whether a signature is present in the image data. The resulting signed signature fields and/or unsigned signature fields are combined with the signed signature fields from the key-value pair analyzer as signature output data.

The signature output data is presented to the customer in the context of the input document, such that signature fields are highlighted or otherwise indicated within the input document. Further, signed signature fields are indicated using a first method and unsigned signature fields are indicated using a second method. For instance, signed signature fields are highlighted with a green color and unsigned signature fields are highlighted with a red color.

While the disclosure primarily describes signature field identification and signature recognition, in other examples, other features of documents are identified and/or recognized without departing from the description. For instance, in some examples, the models described herein are trained to identify entry fields (e.g., lines or regions on form documents that prompt a user to provide an information entry, such as a line for a user to enter a name, an address, an age, a rating of a service or good, a comment associated with a service or good, or the like). Additionally, or alternatively, the models are trained to identify entry fields that do not correspond to text that is detectable by an OCR process, such as cases where a user is requested to circle, strike out, underline, or otherwise mark text or regions of a document as a way of indicating an entry or an option.

In such an example, upon receiving an input document, OCR data is generated from image data of the input document. A first set of entry fields of the input document is identified using entry key-value pairs of the generated OCR data. A first subset of filled entry fields (e.g., entry fields that have a valid response from a user in the input document) and a first subset of unfilled entry fields (e.g., entry fields that have no user response or an uninterpretable user response) are determined from the first set of entry fields based on mapping to a set of predicted values (e.g., valid, or otherwise interpretable user responses to entry fields).

Additionally, a second set of entry fields of the input document are determined using a region prediction model applied to the image data of the input document. Region images are obtained for each entry field of the first subset of unfilled entry fields and with each entry field of the second set of entry fields. A second subset of filled entry fields of the obtained region images and a second subset of unfilled entry fields of the obtained region images are determined using an entry recognition model. Entry output data of the input document is provided in response to the input document, wherein the entry output data includes at least one of the following: the first subset of filled entry fields, the second subset of filled entry fields, and the second subset of unfilled entry fields.

In a related example, generating the second set of entry fields of the input document using the region prediction model applied to the image data of the input document includes: predicting, by a page selection model, that a subset of document pages from a set of document pages of the image data include entry fields; identifying, by the processor, a set of entry field regions in the predicted subset of document pages using the region prediction model; and generating, by the processor, the second set of entry fields associated with the identified set of entry field regions.

In another related example, operations of the system further include identifying a set of anchors in training document data including at least one of the following: training document image data and training document text data (e.g., OCR data); sampling a set of points in the training document image data; labeling the set of points according to proximity to entry regions; and training the region prediction model to identify a entry region in a document using the identified set of anchors and the labeled set of points inside an entry region.

In another related example, determining the second set of entry fields of the input document using the region prediction model includes: identifying, by the region prediction model, anchors of the set of anchors in the input document; and determining, by the region prediction model, a set of points in the input document associated with the second set of entry fields using locations of the identified anchors in the input document.

In another related example, operations of the system further include identifying a set of text tokens in training document data; determining position data of the set of text tokens; labeling entry regions in the training document data relative to the set of text tokens and the determined position data of the set of text tokens; and training the region prediction model to identify a entry region in a document using the labeled entry regions, the set of text tokens, and the determined position data of the text tokens.

In another related example, operations of the system further include identifying duplicate entry fields in the first set of entry fields and the second set of entry fields; and removing the duplicate entry fields from the second set of entry fields.

Exemplary Operating Environment

Figure 7:
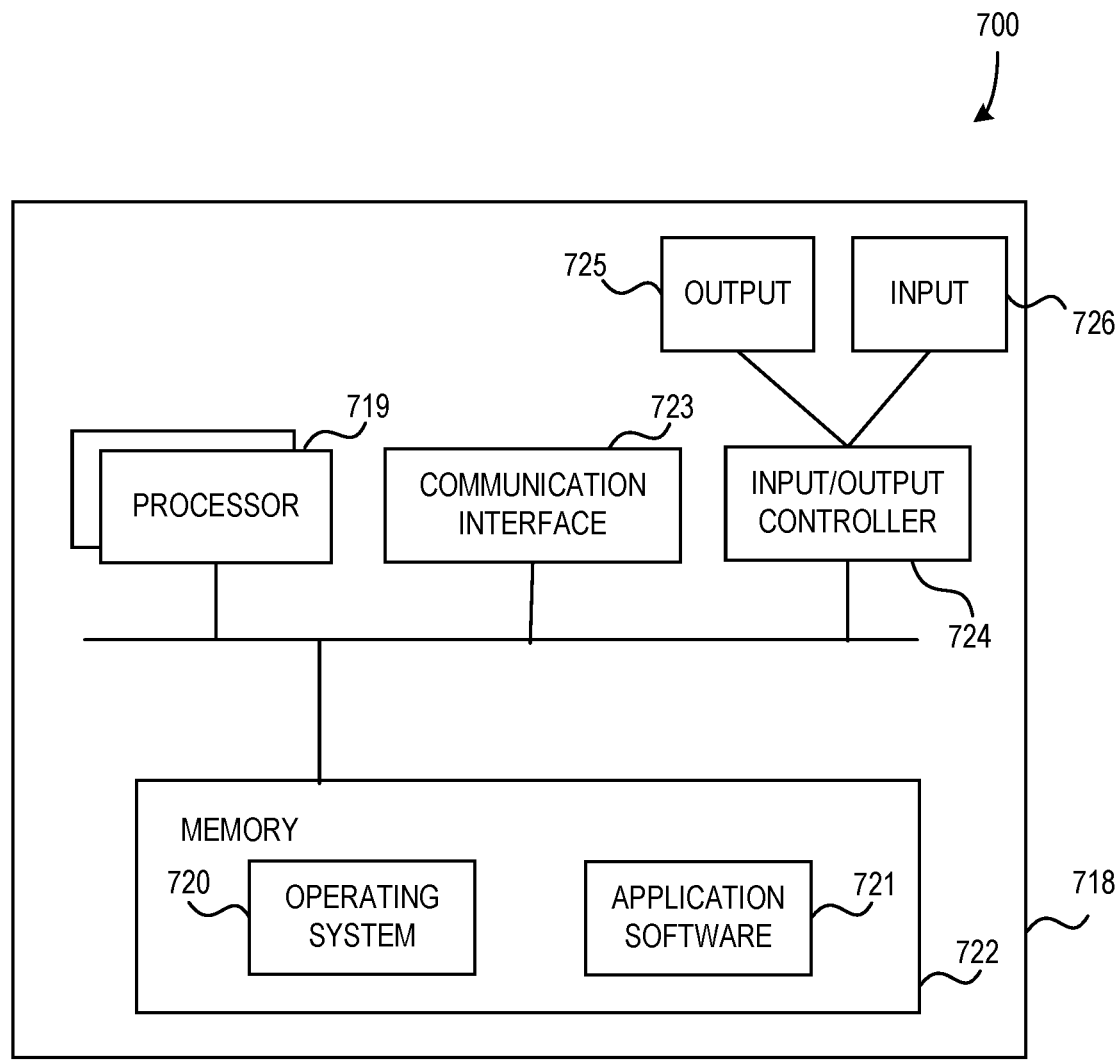
FIG. 7 illustrates an example computing apparatus as a functional block diagram.

The present disclosure is operable with a computing apparatus according to an embodiment as a functional block diagram 700 in FIG. 7. In an example, components of a computing apparatus 718 are implemented as a part of an electronic device according to one or more embodiments described in this specification. The computing apparatus 718 comprises one or more processors 719 which may be microprocessors, controllers, or any other suitable type of processors for processing computer executable instructions to control the operation of the electronic device. Alternatively, or in addition, the processor 719 is any technology capable of executing logic or instructions, such as a hard-coded machine. In some examples, platform software comprising an operating system 720 or any other suitable platform software is provided on the apparatus 718 to enable application software 721 to be executed on the device. In some examples, training models using training documents to identify signature fields in input documents and providing signature output data using the trained models as described herein is accomplished by software, hardware, and/or firmware.

In some examples, computer executable instructions are provided using any computer-readable media that are accessible by the computing apparatus 718. Computer-readable media include, for example, computer storage media such as a memory 722 and communications media. Computer storage media, such as a memory 722, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 722) is shown within the computing apparatus 718, it will be appreciated by a person skilled in the art, that, in some examples, the storage is distributed or located remotely and accessed via a network or other communication link (e.g., using a communication interface 723).

Further, in some examples, the computing apparatus 718 comprises an input/output controller 724 configured to output information to one or more output devices 725, for example a display or a speaker, which are separate from or integral to the electronic device. Additionally, or alternatively, the input/output controller 724 is configured to receive and process an input from one or more input devices 726, for example, a keyboard, a microphone, or a touchpad. In one example, the output device 725 also acts as the input device. An example of such a device is a touch sensitive display. The input/output controller 724 may also output data to devices other than the output device, e.g., a locally connected printing device. In some examples, a user provides input to the input device(s) 726 and/or receive output from the output device(s) 725.

The functionality described herein can be performed, at least in part, by one or more hardware logic components. According to an embodiment, the computing apparatus 718 is configured by the program code when executed by the processor 719 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises: at least one processor; and at least one memory comprising computer program code, the at least one memory and the computer program code configured to, with the at least one processor, cause the at least one processor to: identify a first set of entry fields of the input document using entry key-value pairs of text data of the input document; determine a first subset of filled entry fields and a first subset of unfilled entry fields from the first set of entry fields based on mapping to a set of predicted values; determine a second set of entry fields of the input document using a region prediction model applied to the image data of the input document; obtain region images associated with each entry field of the first subset of unfilled entry fields and with each entry field of the second set of entry fields; determine a second subset of filled entry fields and a second subset of unfilled entry fields from the obtained region images using an entry recognition model; and provide entry output data of the input document, wherein the entry output data includes at least one of the following: the first subset of filled entry fields, the second subset of filled entry fields, and the second subset of unfilled entry fields.

An example computerized method for providing signature data of an input document comprises: identifying, by the processor, a first set of signature fields of the input document using signature key-value pairs of text data of the input document; determining, by the processor, a first subset of signed signature fields and a first subset of unsigned signature fields from the first set of signature fields based on mapping to a set of predicted values; determining, by the processor, a second set of signature fields of the input document using a region prediction model applied to image data of the input document; obtaining, by the processor, region images associated with each signature field of the first subset of unsigned signature fields and with each signature field of the second set of signature fields; determining, by the processor, a second subset of signed signature fields and a second subset of unsigned signature fields from the obtained region images using a signature recognition model; and providing, by the processor, signature output data of the input document, wherein the signature output data includes at least one of the following: the first subset of signed signature fields, the second subset of signed signature fields, and the second subset of unsigned signature fields.

One or more computer storage media having computer-executable instructions for providing entry field data of an input document that, upon execution by a processor, cause the processor to at least: identify a first set of entry fields of the input document using entry key-value pairs of text data of the input document; determine a first subset of filled entry fields and a first subset of unfilled entry fields from the first set of entry fields based on mapping to a set of predicted values; determine a second set of entry fields of the input document using a region prediction model applied to the image data of the input document; obtain region images associated with each entry field of the first subset of unfilled entry fields and with each entry field of the second set of entry fields; determine a second subset of filled entry fields and a second subset of unfilled entry fields from the obtained region images using an entry recognition model; and provide entry output data of the input document, wherein the entry output data includes at least one of the following: the first subset of filled entry fields, the second subset of filled entry fields, and the second subset of unfilled entry fields.

Alternatively, or in addition to the other examples described herein, examples include any combination of the following:

wherein generating the second set of signature fields of the input document using the region prediction model applied to the image data of the input document includes: predicting, by a page selection model, that a subset of document pages from a set of document pages of the image data include signature fields; identifying, by the processor, a set of signature field regions in the predicted subset of document pages using the region prediction model; and generating, by the processor, the second set of signature fields associated with the identified set of signature field regions.

further comprising training, by the processor, the region prediction model, the training including: identifying a set of anchors in training document data including at least one of the following: training document image data and training document text data; sampling a set of points in the training document image data; labeling the set of points according to proximity to signature regions; and training the region prediction model to identify a signature region in a document using the identified set of anchors and the labeled set of points inside a signature region.

wherein determining, by the processor, the second set of signature fields of the input document using the region prediction model includes: identifying, by the region prediction model, anchors of the set of anchors in the input document; and determining, by the region prediction model, a set of points in the input document associated with the second set of signature fields using locations of the identified anchors in the input document.

further comprising training, by the processor, the region prediction model, the training including: identifying a set of text tokens in training document data; determining position data of the set of text tokens; labeling signature regions in the training document data relative to the set of text tokens and the determined position data of the set of text tokens; and training the region prediction model to identify a signature region in a document using the labeled signature regions, the set of text tokens, and the determined position data of the text tokens.

further comprising: identifying, by the processor, duplicate signature fields in the first set of signature fields and the second set of signature fields; and removing, by the processor, the duplicate signature fields from the second set of signature fields.

further comprising training the signature recognition model, the training including: generating a dataset of synthetic signature fields; and training the signature recognition model to recognize a signature in a signature field using machine learning techniques and the dataset of synthetic signature fields as training data.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for generating, by a processor, OCR data of the input document from image data of the input document; exemplary means for identifying, by the processor, a first set of signature fields of the input document using signature key-value pairs of the generated OCR data; exemplary means for determining, by the processor, a first subset of signed signature fields and a first subset of unsigned signature fields from the first set of signature fields based on mapping to a set of predicted values; exemplary means for determining, by the processor, a second set of signature fields of the input document using a region prediction model applied to the image data of the input document; exemplary means for obtaining, by the processor, region images associated with each signature field of the first subset of unsigned signature fields and with each signature field of the second set of signature fields; exemplary means for determining, by the processor, a second subset of signed signature fields and a second subset of unsigned signature fields from the obtained region images using a signature recognition model; and exemplary means for providing, by the processor, signature output data of the input document, wherein the signature output data includes at least one of the following: the first subset of signed signature fields, the second subset of signed signature fields, and the second subset of unsigned signature fields.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
   at least one processor; and
   at least one memory comprising computer program code, the at least one memory and the computer program code configured to, with the at least one processor, cause the at least one processor to:
   identify a first set of entry fields of an input document using entry key-value pairs of text data of the input document;
   determine a first subset of filled entry fields and a first subset of unfilled entry fields from the first set of entry fields based on mapping to a set of predicted values;
   determine a second set of entry fields of the input document using a region prediction model applied to the image data of the input document;

obtain region images associated with each entry field of the first subset of unfilled entry fields and with each entry field of the second set of entry fields;

determine a second subset of filled entry fields and a second subset of unfilled entry fields from the obtained region images using an entry recognition model, the entry recognition model trained using a dataset of synthetic entry fields generated for use as training data for the entry recognition model, the entry recognition model trained, using the training data, to recognize an entry in an entry field using machine learning techniques; and provide entry output data of the input document, wherein the entry output data includes at least one of the following: the first subset of filled entry fields, the second subset of filled entry fields, and the second subset of unfilled entry fields.

2. The system of claim 1, wherein generating the second set of entry fields of the input document using the region prediction model applied to the image data of the input document includes:

predicting, by a page selection model, that a subset of document pages from a set of document pages of the image data include entry fields;

identifying a set of entry field regions in the predicted subset of document pages using the region prediction model; and generating the second set of entry fields associated with the identified set of entry field regions.

3. The system of claim 1, wherein the at least one memory and the computer program code is configured to, with the at least one processor, further cause the at least one processor to train the region prediction model, the training including:

identifying a set of anchors in training document data including at least one of the following: training document image data and training document text data;

sampling a set of points in the training document image data;

labeling the set of points according to proximity to entry regions; and training the region prediction model to identify an entry region in a document using the identified set of anchors and the labeled set of points inside an entry region.

4. The system of claim 3, wherein determining the second set of entry fields of the input document using the region prediction model includes:

identifying, by the region prediction model, anchors of the set of anchors in the input document; and determining, by the region prediction model, a set of points in the input document associated with the second set of entry fields using locations of the identified anchors in the input document.

5. The system of claim 1, wherein the at least one memory and the computer program code is configured to, with the at least one processor, further cause the at least one processor to train the region prediction model, the training including:

identifying a set of text tokens in training document data;

determining position data of the set of text tokens;

labeling entry regions in the training document data relative to the set of text tokens and the determined position data of the set of text tokens; and training the region prediction model to identify an entry region in a document using the labeled entry regions, the set of text tokens, and the determined position data of the text tokens.

6. The system of claim 1, wherein the at least one memory and the computer program code is configured to, with the at least one processor, further cause the at least one processor to:

identify duplicate entry fields in the first set of entry fields and the second set of entry fields; and remove the duplicate entry fields from the second set of entry fields.

7. The system of claim 1, wherein the at least one memory and the computer program code is configured to, with the at least one processor, further cause the at least one processor to train the entry recognition model, the training including:

generating a dataset of synthetic entry fields; and training the entry recognition model to recognize an entry in an entry field using machine learning techniques and the dataset of synthetic entry fields as training data.

8. A computerized method for providing signature data of an input document, the computerized method comprising:

identifying, by the processor, a first set of signature fields of the input document using signature key-value pairs of text data of the input document;

determining, by the processor, a first subset of signed signature fields and a first subset of unsigned signature fields from the first set of signature fields based on mapping to a set of predicted values;

determining, by the processor, a second set of signature fields of the input document using a region prediction model applied to image data of the input document;

obtaining, by the processor, region images associated with each signature field of the first subset of unsigned signature fields and with each signature field of the second set of signature fields;

determining, by the processor, a second subset of signed signature fields and a second subset of unsigned signature fields of the obtained region images using a signature recognition model, the signature recognition model trained using a dataset of synthetic signature fields generated for use as training data for the signature recognition model, the signature recognition model trained, using training data, to recognize a signature in a signature field using machine learning techniques; and providing, by the processor, signature output data of the input document, wherein the signature output data includes at least one of the following: the first subset of signed signature fields, the second subset of signed signature fields, and the second subset of unsigned signature fields.

9. The computerized method of claim 8, wherein generating the second set of signature fields of the input document using the region prediction model applied to the image data of the input document includes:

predicting, by a page selection model, that a subset of document pages from a set of document pages of the image data include signature fields;

identifying, by the processor, a set of signature field regions in the predicted subset of document pages using the region prediction model; and generating, by the processor, the second set of signature fields associated with the identified set of signature field regions.

10. The computerized method of claim 8, further comprising training, by the processor, the region prediction model, the training including:

identifying a set of anchors in training document data including at least one of the following: training document image data and training document text data;

sampling a set of points in the training document image data;

labeling the set of points according to proximity to signature regions; and training the region prediction model to identify a signature region in a document using the identified set of anchors and the labeled set of points inside a signature region.

11. The computerized method of claim 10, wherein determining, by the processor, the second set of signature fields of the input document using the region prediction model includes:

identifying, by the region prediction model, anchors of the set of anchors in the input document; and determining, by the region prediction model, a set of points in the input document associated with the second set of signature fields using locations of the identified anchors in the input document.

12. The computerized method of claim 8, further comprising training, by the processor, the region prediction model, the training including:

identifying a set of text tokens in training document data;

determining position data of the set of text tokens;

labeling signature regions in the training document data relative to the set of text tokens and the determined position data of the set of text tokens; and training the region prediction model to identify a signature region in a document using the labeled signature regions, the set of text tokens, and the determined position data of the text tokens.

13. The computerized method of claim 8, further comprising:

identifying, by the processor, duplicate signature fields in the first set of signature fields and the second set of signature fields; and removing, by the processor, the duplicate signature fields from the second set of signature fields.

14. The computerized method of claim 8, further comprising training the signature recognition model, the training including:

generating a dataset of synthetic signature fields; and training the signature recognition model to recognize a signature in a signature field using machine learning techniques and the dataset of synthetic signature fields as training data.

15. One or more computer storage media having computer-executable instructions for providing entry field data of an input document that, upon execution by a processor, cause the processor to at least:

identify a first set of entry fields of the input document using entry key-value pairs of text data of the input document;

determine a first subset of filled entry fields and a first subset of unfilled entry fields from the first set of entry fields based on mapping to a set of predicted values;

determine a second set of entry fields of the input document using a region prediction model applied to the image data of the input document;

obtain region images associated with each entry field of the first subset of unfilled entry fields and with each entry field of the second set of entry fields;

determine a second subset of filled entry fields and a second subset of unfilled entry fields of the obtained region images using an entry recognition model, the entry recognition model trained using a dataset of synthetic entry fields generated for use as training data for the entry recognition model, the entry recognition model trained, using the training data, to recognize an entry in an entry field using machine learning techniques; and provide entry output data of the input document, wherein the entry output data includes at least one of the following: the first subset of filled entry fields, the second subset of filled entry fields, and the second subset of unfilled entry fields.

16. The one or more computer storage media of claim 15, wherein generating the second set of entry fields of the input document using the region prediction model applied to the image data of the input document includes:

predicting, by a page selection model, that a subset of document pages from a set of document pages of the image data include entry fields;

identifying a set of entry field regions in the predicted subset of document pages using the region prediction model; and generating the second set of entry fields associated with the identified set of entry field regions.

17. The one or more computer storage media of claim 15, wherein the computer-executable instructions, upon execution by a processor, further cause the processor to at least:

identify a set of anchors in training document data including at least one of the following: training document image data and training document text data;

sample a set of points in the training document image data;

label the set of points according to proximity to entry regions; and train the region prediction model to identify an entry region in a document using the identified set of anchors and the labeled set of points inside an entry region.

18. The one or more computer storage media of claim 17, wherein determining the second set of entry fields of the input document using the region prediction model includes:

identifying, by the region prediction model, anchors of the set of anchors in the input document; and determining, by the region prediction model, a set of points in the input document associated with the second set of entry fields using locations of the identified anchors in the input document.

19. The one or more computer storage media of claim 15, wherein the computer-executable instructions, upon execution by a processor, further cause the processor to at least:

identify a set of text tokens in training document data;

determine position data of the set of text tokens;

label entry regions in the training document data relative to the set of text tokens and the determined position data of the set of text tokens; and train the region prediction model to identify an entry region in a document using the labeled entry regions, the set of text tokens, and the determined position data of the text tokens.

20. The one or more computer storage media of claim 15, wherein the computer-executable instructions, upon execution by a processor, further cause the processor to at least:

identify duplicate entry fields in the first set of entry fields and the second set of entry fields; and remove the duplicate entry fields from the second set of entry fields.

* * * * *